United States Patent
Satoh et al.

(10) Patent No.: US 7,270,780 B2
(45) Date of Patent: Sep. 18, 2007

(54) MOLDING MOLD, MOLDING METHOD AND TAPE CARTRIDGE

(75) Inventors: Takateru Satoh, Tokyo (JP); Hiroki Suzuki, Tokyo (JP); Akio Momoi, Tokyo (JP)

(73) Assignee: TDK Corporation, Tokyo (JP)

( * ) Notice: Subject to any disclaimer, the term of this patent is extended or adjusted under 35 U.S.C. 154(b) by 552 days.

(21) Appl. No.: 10/728,272

(22) Filed: Dec. 3, 2003

(65) Prior Publication Data

US 2004/0170717 A1    Sep. 2, 2004

(30) Foreign Application Priority Data

Dec. 3, 2002    (JP)    ............... 2002-351660

(51) Int. Cl.
    B29C 45/14    (2006.01)
    B29C 70/78    (2006.01)
(52) U.S. Cl. .............. 264/271.1; 264/328.12; 425/116; 425/129.1
(58) Field of Classification Search ........ 425/116, 425/129.1; 264/271.1, 328.12
    See application file for complete search history.

(56) References Cited

U.S. PATENT DOCUMENTS 4,162,047 A * 7/1979 Hashimoto ............. 264/328.12
6,962,305 B2 * 11/2005 Morita ........................ 242/348

FOREIGN PATENT DOCUMENTS

JP    2000-293967    10/2000

OTHER PUBLICATIONS

Patent Abstracts of Japan for JP2000-293967 published on Oct. 20, 2000.

* cited by examiner

Primary Examiner—Robert B. Davis
(74) Attorney, Agent, or Firm—Darby & Darby

(57) ABSTRACT

A molding mold and a molding method are disclosed, for molding a flange configuration in which a flange of a reel hub portion can be maintained in a predetermined configuration. Also a tape cartridge is disclosed, which can securely prevent a tape-shaped recording medium from touching at the flange while the tape cartridge is being used. In the molding mold for molding, a flange configuration is produced, which is provided with a reel hub portion having a flange and a hub arranged at a substantially center of the flange and an insert portion disposed at a substantially center of the reel hub portion at an opposite side of the hub, and which includes: an insert attaching portion; a flange forming portion for forming the flange; and a hub forming portion for forming the hub; wherein in a forming surface of at a side of the hub forming portion of the flange forming portion, a dimension of a circular area over from a root end of the hub forming portion to a substantially intermediate portion between the root end and a circumferential end of the flange forming portion, is corrected in view of deformation upon molding.

12 Claims, 9 Drawing Sheets

MOLDING MOLD, MOLDING METHOD AND TAPE CARTRIDGE

BACKGROUND OF THE INVENTION

1. Field of the Invention

The present invention relates to a molding mold and a molding method for molding a flange configuration, and a tape cartridge.

2. Description of the Prior Art

A one-reel-type cartridge is provided with a reel hub portion having an upper flange and a lower flange at an inside of the cartridge. A tape-shaped recording medium is wound around the hub portion, which is used for storing back-up data for a computer or the like. When the tape cartridge is mounted to a magnetic recording and reproducing apparatus for a computer, the tape-shaped recording medium wound around a hub of an internal reel hub portion is made to be drawn out, and thereafter wound around a reel hub portion at the side of the magnetic recording and reproducing apparatus, so that the tape-shaped recording medium runs between both the hubs, and recording or reproducing are performed. Also, a magnetic plate is attached to a center of the lower flange of the reel hub portion by insert molding, resulting in securely establishing engagement between the reel hub and a driving portion at the side of the magnetic recording and reproducing apparatus.

When such a tape cartridge is mounted to a magnetic recording and reproducing apparatus for a computer and used for storing back-up data, it is required that the tape-shaped recording medium runs, touching at the recording and reproducing head of the apparatus by maintaining an extraordinarily high accuracy as to the positioning.

However, when the reel hub portion of the tape cartridge is produced by molding the lower flange and the hub integrally, the lower flange may be deformed apart from a predetermined configuration, resulting in that there is possibility that upon using the tape cartridge, an under end of a running tape-shaped recording medium might extraordinarily approach toward an inside surface of the lower flange, so that there is possibility that the under end and the inside surface might mutually be touched. If such a touching state happen, there might occur any problem upon recording and reproducing by the recording and reproducing head with relative to the tape-shaped recording medium. Therefore, it is required that the above-mentioned possibility does not occur.

SUMMARY OF THE INVENTION

An object of the present invention is to provide a molding mold and a molding method for molding a flange configuration such that a flange of a reel hub portion can be maintained in a predetermined configuration.

Another object of the present invention is to provide a tape cartridge provided with a reel hub portion in such that it can securely be prevented that a tape-shaped recording medium wound around a hub of a reel hub portion touches at a flange while the tape cartridge is being used.

The present invention was invented on the basis of the result of the present inventor's eager research in order to attain the above objects, according to following comprehension. Namely, when a metal plate is molded integrally with a reel hub portion by an insert molding, shrinkage in the reel hub portion is obstructed by the insert-molded metal plate at a shrinkage process upon cooling and hardening, resulting in that the inventors obtained the comprehension that a predetermined configuration of the flange cannot be maintained because deformation of the flange occurs upon molding at a portion of the flange especially near the metal plate in comparison with a case without insert-molding.

A first molding mold according to the present embodiment, provided with a reel hub portion having a flange and a hub arranged at a substantial center of the flange and an insert portion disposed at a substantial center of the reel hub portion at an opposite side of the hub, includes an insert attaching portion for attaching the insert portion by an insert molding, a flange forming portion for forming the flange, and a hub forming portion for forming the hub, wherein in a molding surface of at a side of the hub forming portion of the flange forming portion, a dimension of a circular area over from a root end of the hub forming portion to a substantially intermediate portion between the root end and a circumferential end of the flange forming portion, is corrected in view of deformation upon molding.

According to the first molding mold, a predetermined configuration of the flange after molding can be maintained even if the reel hub portion has the insert portion, because in the molding surface at the side of the hub forming portion of the flange forming portion, a dimension of a circular area over from the root end near the insert attaching portion to a substantially intermediate portion between the root end and a circumferential end of the flange forming portion, is corrected in view of deformation upon molding.

A second molding mold for molding a flange configuration according to the present embodiment, provided with a reel hub portion having a flange and a hub arranged at a substantial center of the flange, and an insert portion disposed at a substantial center of the reel hub portion at an opposite side of the hub, includes an insert attaching portion for attaching the insert portion by an insert molding, a flange forming portion for forming the flange, and a hub forming portion for forming the hub, wherein in a molding surface at a side of the hub forming portion of the flange forming portion, a dimension of a circular area over from a root end of the hub forming portion to a substantially intermediate portion between the root end and a circumferential end of the flange forming portion, is corrected, so that height from a reference position at a side of the insert portion is set to be larger than the dimension before correction of dimension.

According to the second molding mold, a predetermined configuration of the flange after molding can be maintained even if the reel hub portion has the insert portion, because in the molding surface at a side of the hub forming portion of the flange forming portion, a dimension of a circular area over from the root end near the insert attaching portion to a substantially intermediate portion between the root end and a circumferential end of the flange forming portion, is corrected, so that height from the reference position at a side of the insert portion is set to be larger than height before correction of the dimension.

In each of the above molding molds, it is preferable that an amount of dimension correction in the circular area is changed so that the amount in the root end is larger whereas the amount in the substantially intermediate portion is smaller. Also, it is preferable that the height is substantially as same as the height before correction of the dimension in the substantially intermediate portion.

A third molding mold for molding a flange configuration according to the present invention, provided with a reel hub portion having a flange and a hub arranged at a substantial center of the flange, and an insert portion disposed at a substantial center of the reel hub portion at an opposing side of the hub, includes an insert attaching portion for attaching the insert portion by an insert molding, a flange forming portion for forming the flange, and a hub forming portion for forming the hub, wherein in a circular area over from a root end of the hub forming portion to a substantially intermediate portion between the root end and a circumferential end of the flange forming portion, in a molding surface at a side of the hub forming portion of the. flange forming portion, height from a reference position at a side of the insert portion is gradually reduced so that a degree of its reduction is larger than that of reduction from the substantially intermediate portion to the circumferential end.

According to the third molding mold, a predetermined configuration of the flange after molding can be maintained even if the reel hub portion has the insert portion, because in the molding surface between the root end of the hub portion and the circumferential end of the flange portion and in a circular area over from a root end near the insert attaching portion to a substantially intermediate portion between the root end and the circumferential end of the flange forming portion, height from the reference position at the side of the insert portion is gradually reduced from the root end to the circumferential end so that a degree of its reduction is large as compared with that of reduction from the substantially intermediate portion to the circumferential end.

Specifically, it is preferable that the height in the circular area is substantially linearly reduced at a first gradient, and the height from the substantially intermediate portion to the circumferential end is substantially linearly reduced at a second gradient being more gentle than the first gradient. The height from the substantially intermediate portion to the circumferential end may be substantially constant.

In this case, it is preferable that difference between height at the root end and height when extended to the base portion at the second gradient is within a range of 10 to 100 µm. Also it is more preferable that the difference is within a range of 30 to 60 µm.

A molding method according to the present embodiment is characterized by molding a flange configuration using one of the above-mentioned molding molds. According to the molding method, a predetermined configuration of the flange after molding can be maintained even if the reel hub portion has the insert portion by insert-molding, because the dimension of the circular area over from the root end near the insert attaching portion to the substantially intermediate area is corrected as above-mentioned.

A tape cartridge according to the present embodiment is characterized in that the reel hub portion molded using one of the above-mentioned molding molds has the insert portion at an opposite side of the hub and a tape-shaped recording medium is wound around the hub and rotatably accommodated in the tape cartridge case.

According to this tape cartridge, it can securely be prevented that the tape-shaped recording medium wound around the hub of the reel hub portion touches at the flange while the tape cartridge is being used, and stable and secure recording and reproducing by the tape-shaped recording medium can be performed because a predetermined configuration of the flange after molding can be maintained as above-mentioned.

In this case, a gradient of an inner surface of the flange molded in a molding surface of the flange forming portion is formed so as to be substantially linearly reduced from the root end of the hub to the circumferential end of the flange, even if the reel hub portion has the insert portion.

DETAILED DESCRIPTION OF THE PREFERRED EMBODIMENTS

Figure 1:
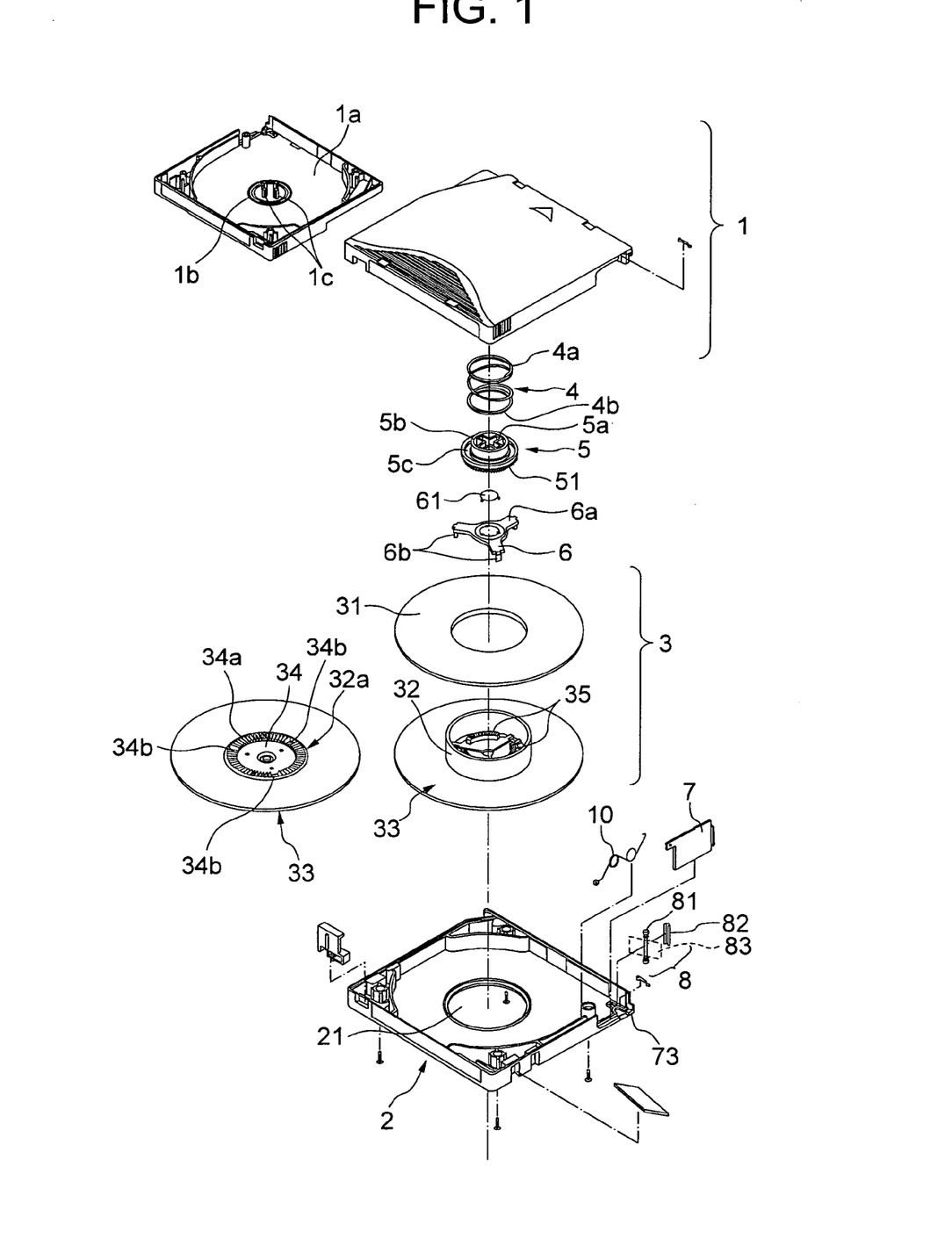
FIG. 1 is an exploded view in perspective of the tape cartridge according to an embodiment of the present invention.
Figure 2:
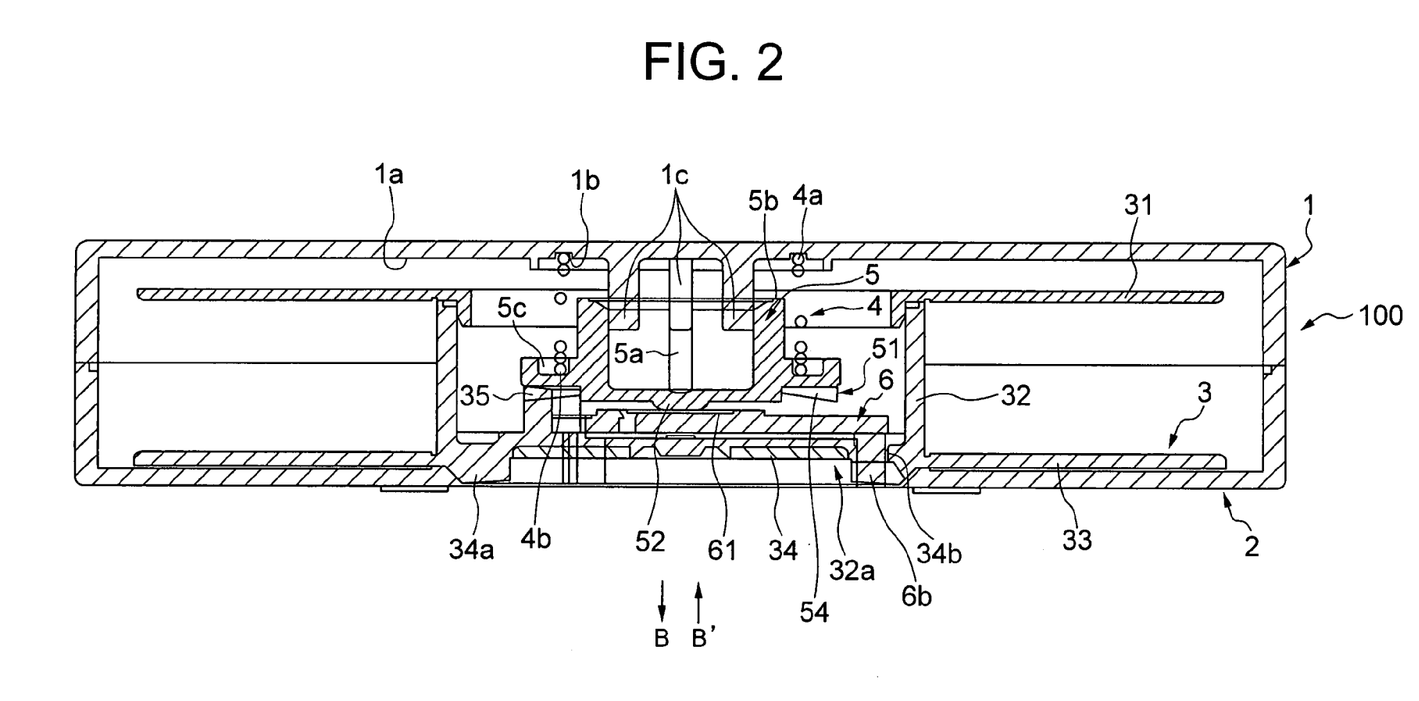
FIG. 2 is a vertical sectional view of the tape cartridge in FIG. 1, which shows a state where the reel hub portion is locked at a locking position.
Figure 3:
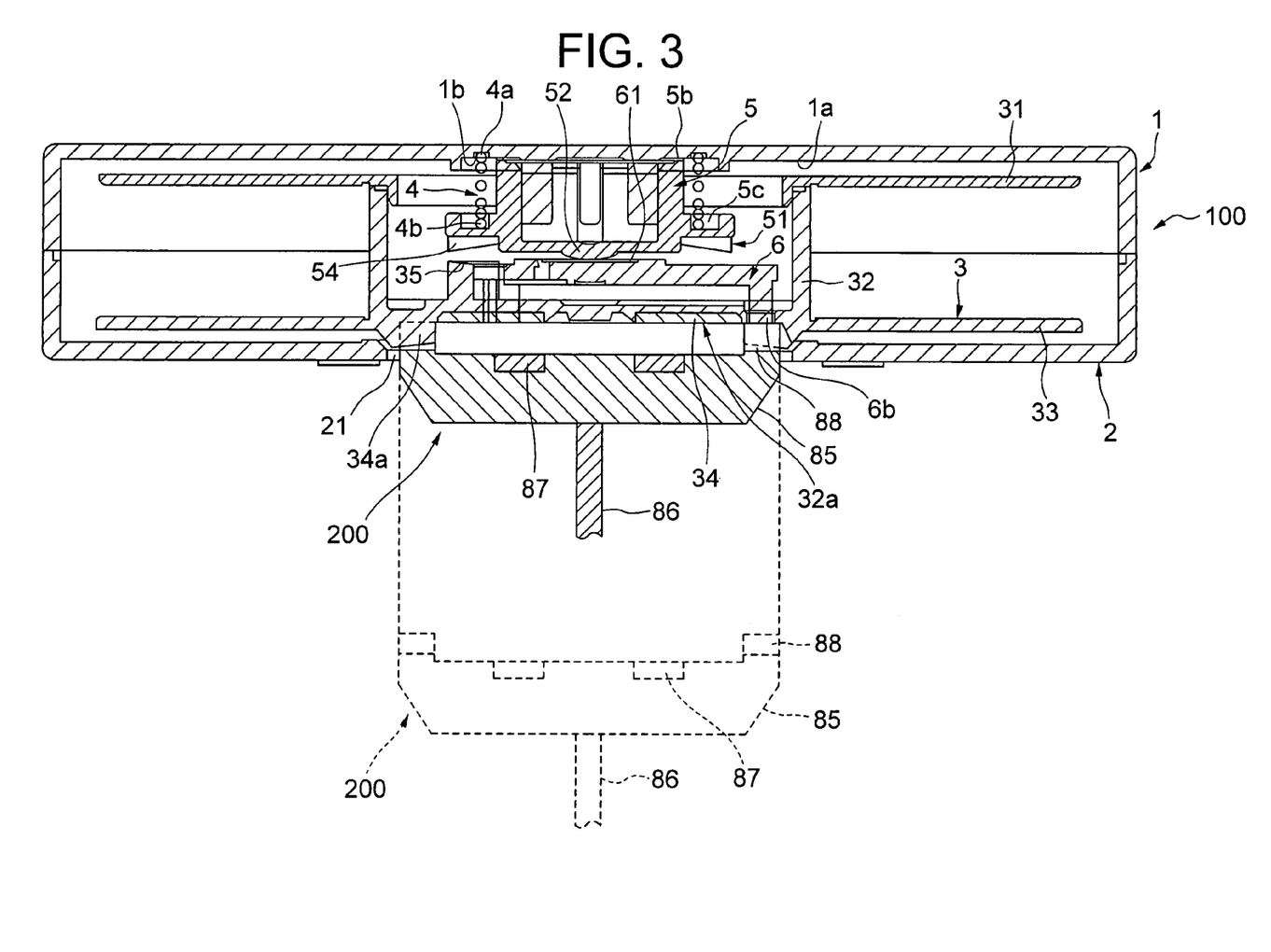
FIG. 3 is a vertical sectional view of the tape cartridge in FIG. 1, which shows a state where locking of the tape reel is released at an unlocking position.

Hereinafter, description will be explained about embodiments of the present invention with reference to the accompanying drawings. FIG. 1 is an exploded view in perspective of a tape cartridge according to an embodiment of the present invention. FIG. 2 is a vertical sectional view of the tape cartridge in FIG. 1, which shows a state where the reel hub portion is locked in the tape cartridge in FIG. 1. FIG. 3 is also a vertical sectional view of the tape cartridge in FIG. 1, which shows a state where locking of the reel hub portion is released. FIG. 1 also shows a perspective view of an upper case 1 and a hub 32 respectively seen from their backsides.

The tape cartridge shown in FIG. 1 is constituted in a rectangular and plane-shaped one-reel type manner, which is provided with an upper case 1 and a lower case 2. The tape cartridge has a reel hub portion 3 on which a magnetic recording tape as a tape-shaped recording medium (which is hereinafter sometimes merely called "tape") is wound at an inside of the tape cartridge. When mounted to a recording and reproducing apparatus, the tape cartridge is constructed so that the reel hub portion 3 can be rotated. The upper case 1 and the lower case 2, respectively can be produced by molding process using resin material.

The reel hub portion 3 is provided with an upper flange 31, a lower flange 33, and a hub 32 formed integrally with the lower flange 33, and around a circumferential surface of the hub 32, the tape-shaped magnetic recording medium is wounded. Also, as shown in FIG. 1, a circle-shaped metal plate 34 made of soft magnetic material is provided integrally with the side of an under surface 32a of the hub 32. Engaging teeth 34a which engages with teeth portion of a driving member 85 (see FIG. 3) at the side of a recording and reproducing apparatus are provided at the periphery of the metal plate 34, which are divided into three sections in its circumferential direction. A plurality of holes 34b penetrate through the opposite surface to the lower surface 32a between the engaging teeth 34a. The metal plate 34, the engaging teeth 34a, and the plurality of holes 34b penetrate through a penetrating hole 21 of the lower case 2 to be exposed for an outside.

A teeth portion 35 is provided so as to be separated in its circumferential direction at a plurality of locations on an opposite surface to the lower surface 32a at an inside of the hub 32. Here, the teeth portion 35 has a large number of teeth which are mated and engaged with a teeth portion 51 of a brake-locking member 5 and which are arranged in a circle manner. The teeth portion 35 can be produced by molding process using resin material such as polycarbonate (PC) or the like. In this case, by mixing glass fiber with the resin material, its strength may be enhanced.

As shown in FIG. 1 and FIG. 2, the brake-locking member 5 is arranged at an inside of the hub 32. Therein, the large number of teeth are provided with the teeth portion 51 which is arranged in a circular manner; a cross-shaped engaging hole 5a being formed on an end surface of a cylinder whose diameter is smaller than the diameter of the teeth portion 51; an end portion 5b at the periphery of the cross-shaped hole 5a; and a ring-shaped groove 5c which is formed so that an end portion 4b of a brake-locking spring 4 is accommodated at a back surface of the teeth portion 51 so that the large number of teeth 54 are mated and engaged with the teeth portion 35 of the hub portion 32. The brake-locking member 5 can be produced by molding process using resin material such as polyacetal (POM) or the like.

The brake-locking member 5 is, as shown in FIG. 1 and FIG. 2, mounted to the upper case 1 so that a plurality of engaging projecting portions 1c being provided so as to be upright to an inner surface 1a of the upper case 1 are inserted into the cross-shaped hole 5a, so as to be movably engaged in a vertical direction of each of drawing papers of FIG. 1 and FIG. 2. A tip end 4a of the brake-locking spring 4 is fitted with ring-shaped grooves 1b of the inner surface 1a of the upper case 1. And the brake-locking spring 4 is located between the ring-shaped grooves 1b of the upper case 1 and the ring-shaped grooves 5c of the brake-locking member 5, and always biases against the brake lock member 5 in the direction of an arrow B in FIG. 2, so that the teeth portion 51 and the teeth portion 35 of the hub portion 32 are mutually mated and engaged, resulting in preventing the tape reel 3 from being rotated to establish a braking state.

A brake releasing member 6 is arranged between the hub 32 and the brake-locking member 5, which is provided with a main plate 6a and a plurality of leg portions 6b projected downwardly in FIG. 1 from a plurality of portions at the periphery of the main plate 6a. The plurality of leg portions 6b are inserted into a plurality of holes 34b at the lower surface of the hub 32. When the tape cartridge is mounted to the recording and reproducing apparatus, the leg portion 6b of the brake-releasing member 6 is lifted up upwardly by pushing them from below in FIG. 1. Thus, as shown in FIG. 3, the brake-locking portion 5 is, by way of a pressure equalizing plate 61 of the brake-locking member, lifted up upwardly against a biasing force of the brake-locking spring 4 at a center of a convex bearing portion 52 at the center, resulting in that the end portion 5b is moved to an unlocked location so as to approach to the inner surface 1a.

The tip end 83 (represented by a dotted line in FIG. 1) of the magnetic recording tape which is wounded around the tape reel 3 is fixed to leader members 8. In the leader members 8, the tip end 83 of the magnetic recording tape is wound on a pin member 81, and from above it, a C-shaped cramp 82 is fitted therewith to establish a fixing state. When the tape cartridge is mounted to the recording and reproducing apparatus, the leader members 8 are held using a holding member at the side of the apparatus, and drawn from a tape drawing opening 73 (see FIG. 1) to the side of the apparatus.

Further, the tape drawing opening 73 is opened and closed using a door member 7. The door member 7 is biased toward a direction where the tape drawing opening 73 is always closed using the spring member 10, so that when mounted using the recording and reproducing apparatus, the door member 7 is opened against the biasing force of the spring member 10 using the opening member at the side of the apparatus (not shown).

The tape cartridge shown in FIG. 1 to FIG. 3, when not used, e.g., when reserved, the brake-locking member 5 is biased by the brake-locking spring 4 and moved to the locking position as shown in FIG. 2. Thus, by engagement of each tooth 54 of the teeth portion 51 of the brake-locking member 5 with each tooth of the teeth portion 35 of the hub 32 of the reel hub portion 3, the reel hub portion 3 is braked and cannot be rotated, resulting in that unnecessary rotation is prevented and thereby loosing of the magnetic recording tape can be prevented.

Figure 4:
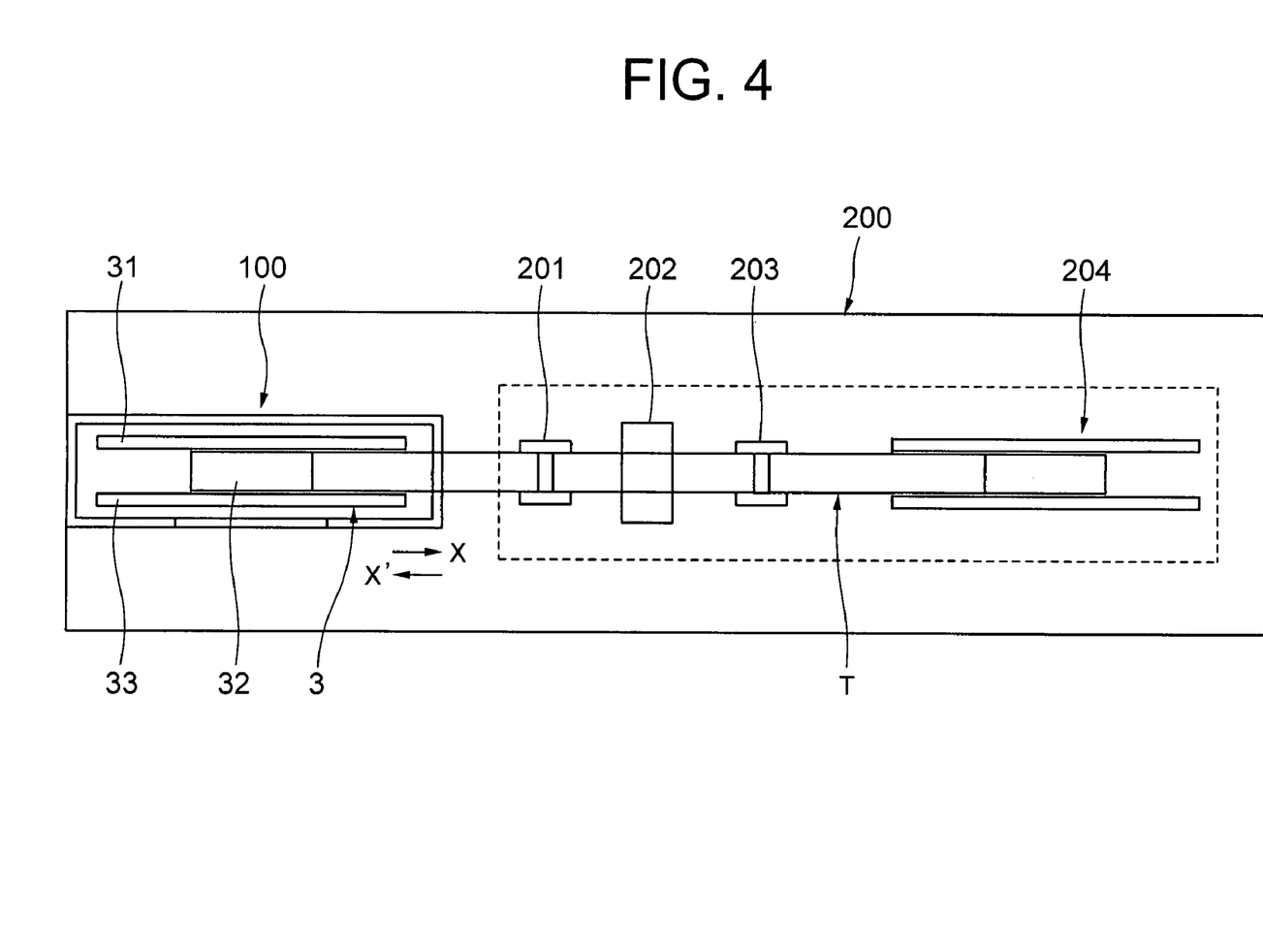
FIG. 4 is a front view, which schematically shows a running route of a tape drawn from the tape cartridge shown in FIG. 1 to FIG. 3 for the recording and reproducing apparatus.

Next, description will be further explained, referring to FIG. 4 about a case where the tape cartridge has been mounted to the recording and reproducing apparatus. FIG. 4 is a front view, which schematically shows a running route of a tape drawn from the tape cartridge shown in FIG. 1 to FIG. 3 to the recording and reproducing apparatus.

As shown in FIG. 3, in a driving member 85 at the side of a recording and reproducing apparatus 200, a teeth portion 88 engaged with the engaging teeth 34a of the hub 32 is formed at a circumferential portion of the driving member 85. Also a ring-shaped magnet 87 is embedded at the side of inner circumferential portion of the teeth portion 88.

As shown in FIG. 4 when the tape cartridge 100 is mounted to the recording and reproducing apparatus 200, as shown in FIG. 3 the driving member 85 at the side of the apparatus 200 and the tape cartridge 100 relatively approaches each other, and the driving member 85 penetrates through a penetrating hole 21 of the lower case 2. Thereafter, the magnet 87 of the driving member 85 approaches to a metal plate 34 made of soft magnetic material at the side of the lower surface 32a of the hub 32 and magnetically absorbs the metal plate 34, and the teeth portion 88 of the driving member 85 is engaged with the engaging teeth 34a of the hub 32. Further, the projecting portion of the teeth portion 88 of the driving member 85 allows the brake-releasing member 6 to be moved in a direction of an arrow B' (which is opposite to the direction of the arrow B (see FIG. 2)) using a leg portion 6b, resulting in that the brake-locking member 5 is moved against the biasing force of the brake-locking spring 4 by a constant stroke to arrive at a non-locked position as shown in FIG. 3, so that there occurs a gap between the teeth portion 51 and the teeth portion 35 and then the mating state of the teeth portion 51 with the teeth portion 35 is released. Thus, the reel hub portion 3 can be rotated by rotation of a driving axle 86 of the driving member 85.

Further, the door member 7 is opened by an opening member (unshown) at the side of the apparatus 200, the leader members 8 are held by the holding member (unshown) at the side of the apparatus 200, and the magnetic recording tape is drawn toward the side of the apparatus 200 and thereafter wound around the hub of the reel hub portion 204. And the reel hub portion 3 of the tape cartridge 100 and the reel hub portion 204 of the recording and reproducing apparatus 200 are rotated and driven, resulting in that as shown in FIG. 4 a magnetic recording tape T is guided at both sides of a recording and reproducing head 202 by a guide 201 and a guide 203 and run in a horizontal direction X or a horizontal direction X' being opposite with relative to the direction X. Thus recording and reproducing operation is performed for the magnetic recording tape T using the recording and reproducing head 202.

Figure 5:
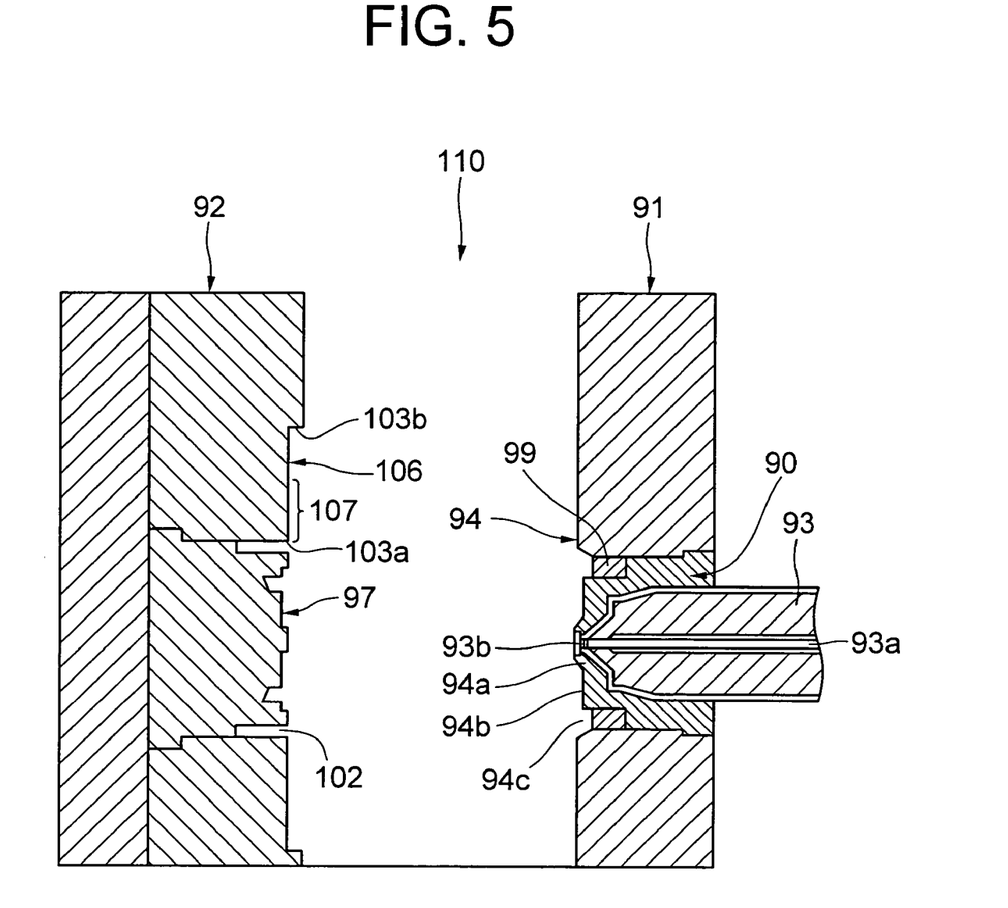
FIG. 5 is a sectional view of a main portion, which shows a stationary side mold and a movable side mold in a separated state of a molding mold for molding the reel hub portions shown in FIG. 1 to FIG. 3.
Figure 6:
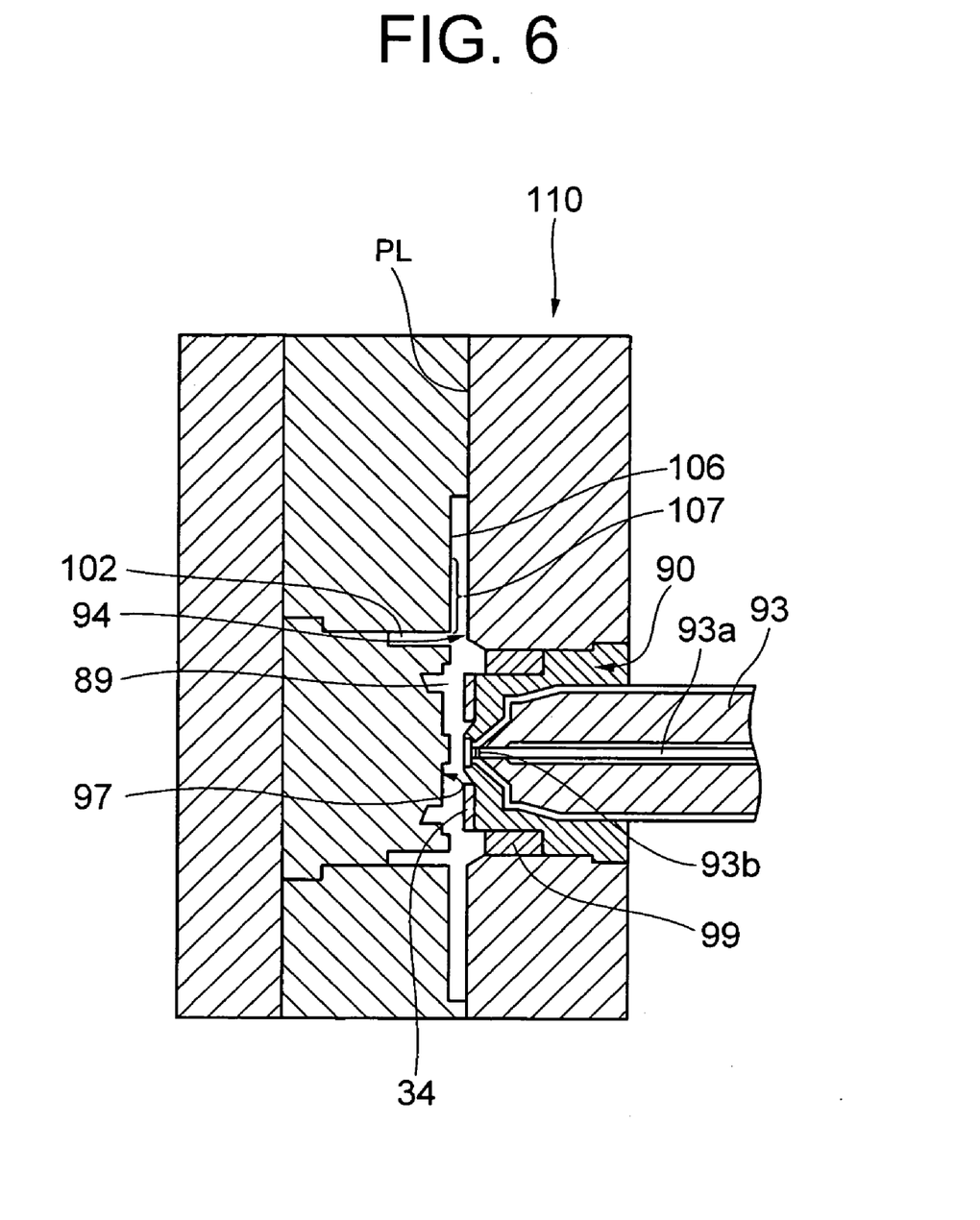
FIG. 6 is a sectional view of a main portion, which shows a molding mold in a state where the stationary side mold and the movable side mold are assembled in a moldable manner.

Next, description will be explained about the molding mold according to the present embodiment, referring to FIG. 5 and FIG. 6. FIG. 5 is a sectional view of a main portion, which shows a stationary side mold and a movable side mold in a separated state of a molding mold for molding the reel hub portions shown in FIG. 1 to FIG. 3. FIG. 6 is a sectional view of a main portion, which shows a molding mold in a state where the stationary side mold and the movable side mold are assembled in a moldable manner.

A molding mold 110 shown in FIG. 5 and FIG. 6 is for molding the reel hub portion 3 of the tape cartridge shown in FIG. 1 to FIG. 3 (except for the upper flange 31). The molding mold 110 is provided with a stationary side mold 91 having a cavity surface 94 and a movable side mold 92 having a cavity surface 97. The stationary side mold 91 is fixed to an attachment surface of a molding machine (not shown) and the movable side mold 92 is movably fixed to an attachment surface of the molding machine (also not shown) so that the cavity surface 94 and the cavity surface 97 respectively are extended in a vertical direction.

As shown in FIG. 6, when the movable side mold 92 is moved, and the stationary side mold 91 and the movable side mold 92 are abutted on a PL plane (abutment plane), so as to be assembled in a moldable manner, then a cavity 89 is formed by the cavity surface 94 of the stationary side mold 91 and the cavity surface 97 of the movable side mold 92. The cavity 89 has a configuration corresponding to a configuration of the reel hub portion 3 in FIG. 1 (except for the upper flange 31),which is directed to a molded product.

As shown in FIG. 5 and FIG. 6, a center portion 90 of the stationary side mold 91 is for molding the engaging teeth 34a of the lower flange 33 of the reel hub portion 3 in FIG. 1 and for insert-molding the metal plate 34 at the inner circumferential portion of the circular belt-shaped engaging teeth 34a.

The center portion 90 of the stationary side mold 91 comprises a convex portion 94a at the center of the cavity surface 94, a circle-shaped flat surface 94b where the metal plate 34 which is an insert element to be fitted into the convex portion 94a is positioned on the cavity surface 94, a cylindrical member 99 having a teeth forming portion 94c for forming the engaging teeth 34a (see FIG. 1) arranged around the plane 94b, and an intermediate material 93 formed so that a spool 93a being a passage for melted resin penetrates through the center and is fitted into the center portion 90.

As shown in FIG. 5 and FIG. 6, the cavity 89 of the molding mold 110 has a hub forming portion 102 for forming the hub 32 of the reel hub portion 3 at the side of the movable mold 92. Also the cavity surface 97 of the movable side mold 92 has a circular flat area 106 which is extended from the root end 103a of the hub forming portion 102 to the circumferential end 103b corresponding to the circumferential end 33b (see FIG. 8) of the inner surface 36 in order to form the inner surface of the lower flange 33 (see FIG. 8).

Figure 7:
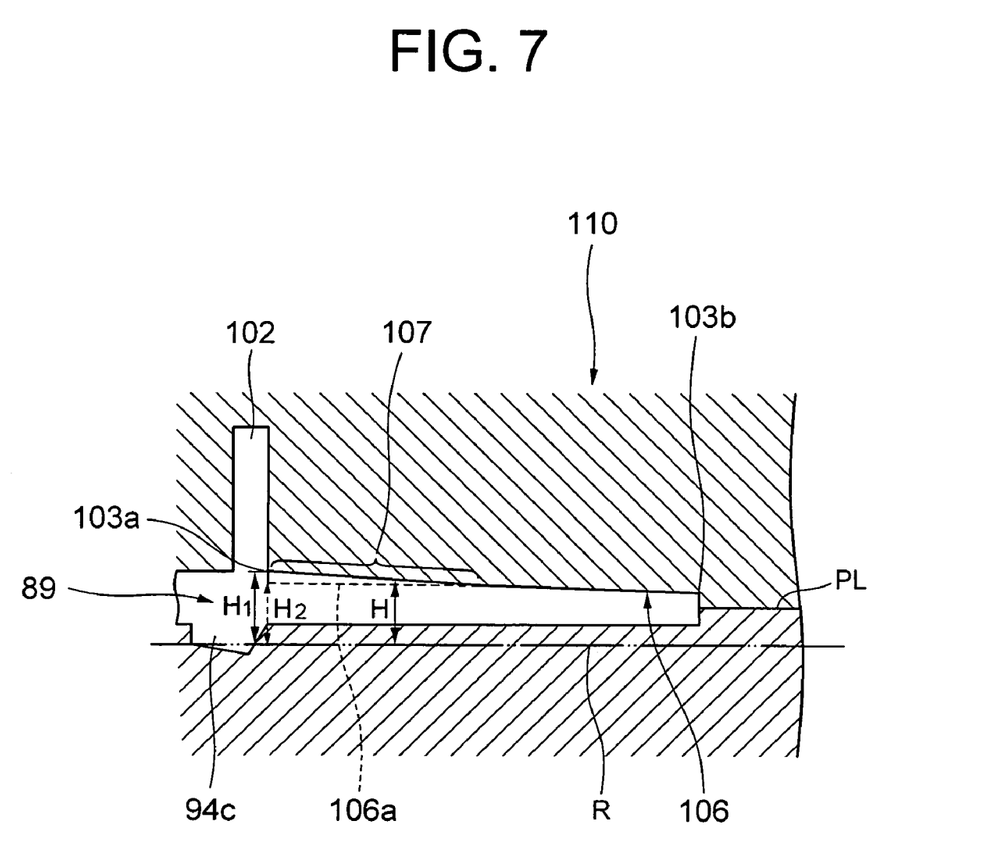
FIG. 7 is a sectional view of the main portion, which shows a substantially half portion of a cavity 89 of the molding mold of FIG. 6, which is enlarged.

In the flat area 106 of the cavity surface 97 in FIG. 5, the dimension of the circular area 107 over from the root end 103a to its substantially intermediate portion is corrected in view of deformation upon molding. Description will be explained about the correction of the dimension, referring to FIG. 7. FIG. 7 is a sectional view of the main portion, which shows a substantially half portion of a cavity 89 of the molding mold of FIG. 6, which is enlarged. Note that in FIG. 7, a shape of the flat area 106 of the cavity surface 97 is exaggerated for convenience for its explanation.

As shown in FIG. 7, the circular area 107 over from the root end 103a of the hub forming portion 102 to the substantially intermediate area in the flat area 106 is an area to be objected for the correction of the dimension. Namely, the circular area 106a before the correction represented by a dotted line in FIG. 7 is corrected so as to become higher with relative to a reference line R (as represented by an alternate long and two short dashes line in FIG. 7) passing through a substantially intermediate point in a direction of height of the teeth forming portion 94c for molding the engaging teeth 34a (see FIG. 1).

The circular area 106a before the correction is formed so that it's height from the reference line R is substantially linearly reduced from the root end 103a to the circumferential end 103b. On the other hand, the circular area 107 is formed so that the height H from the reference line R is higher than the height of the circular area 106a before the correction from the root end 103a to the substantially intermediate area, and so as to have a reduced gradient such that the root end 103a is higher and thus the gradient is gradually lower toward the substantially intermediate portion.

Namely, as shown in FIG. 7, the height H from the reference line R is substantially linearly reduced in the circular area 107 and reduced by a steeper gradient than a gradient of the area 106b which is substantially linearly reduced to the circumferential end 103b at the outside of the circular area 107. And as represented by the dotted line in FIG. 7, height H2 from the reference line R when the gradient of the area 106b is extended from the area 106b to the root end 103a is lower than height H1 from the reference line R at the root end 103a. Then difference between H2 and H1 (i.e., (H2−H1)) preferably is within a range of 10 to 100 μm and more preferably is within a range of 30 to 60 μm.

Next, description will be explained about molding of the reel hub portion 3 (note FIG. 1) by the molding mold 110. In a state where the stationary side mold 91 and the movable mold 92 are separated as shown in FIG. 5, the metal plate 34 (see FIG. 6) as an insert element is fitted into the plane 94b at the center portion 90 of the stationary side mold 91 from the center hole 34c (see FIG. 1), and thus fixed. And as shown in FIG. 6, the stationary side mold 91 and the movable side mold 92 are assembled, resulting in that the molding mold 110 is made to be in a moldable state and thereafter injection molding is performed so that melted resin is injected from a gate portion 93b into the cavity 89 through the spool 93a of the intermediate material 93 from the stationary side mold 91. Through such an injection molding, the reel hub portion 3 (except for the upper flange 31) can be produced. As shown in FIG. 1, the engaging teeth 34a is formed in a circular band-shaped manner in the center surface of the lower flange 33 at the side of the opposite side of the hub 32 of the reel hub portion 3 as the molded product while the metal plate 34 is integrally assembled into the concave portion at an inside with relative to the circle-and band-shaped engaging teeth 34a.

Note that mixed resin material can be used in which resin such as polycarbonate, polyamide, polybutylene, or polyphenylene sulfide is mixed with reinforcement material (such as glass fiber, carbon fiber, or metal powder) as a molding material of the reel hub portion 3 in FIG. 1 (except for the upper flange 31). However, the mixed resin material is not limited to them, i.e., the other material may be used.

Figure 8:
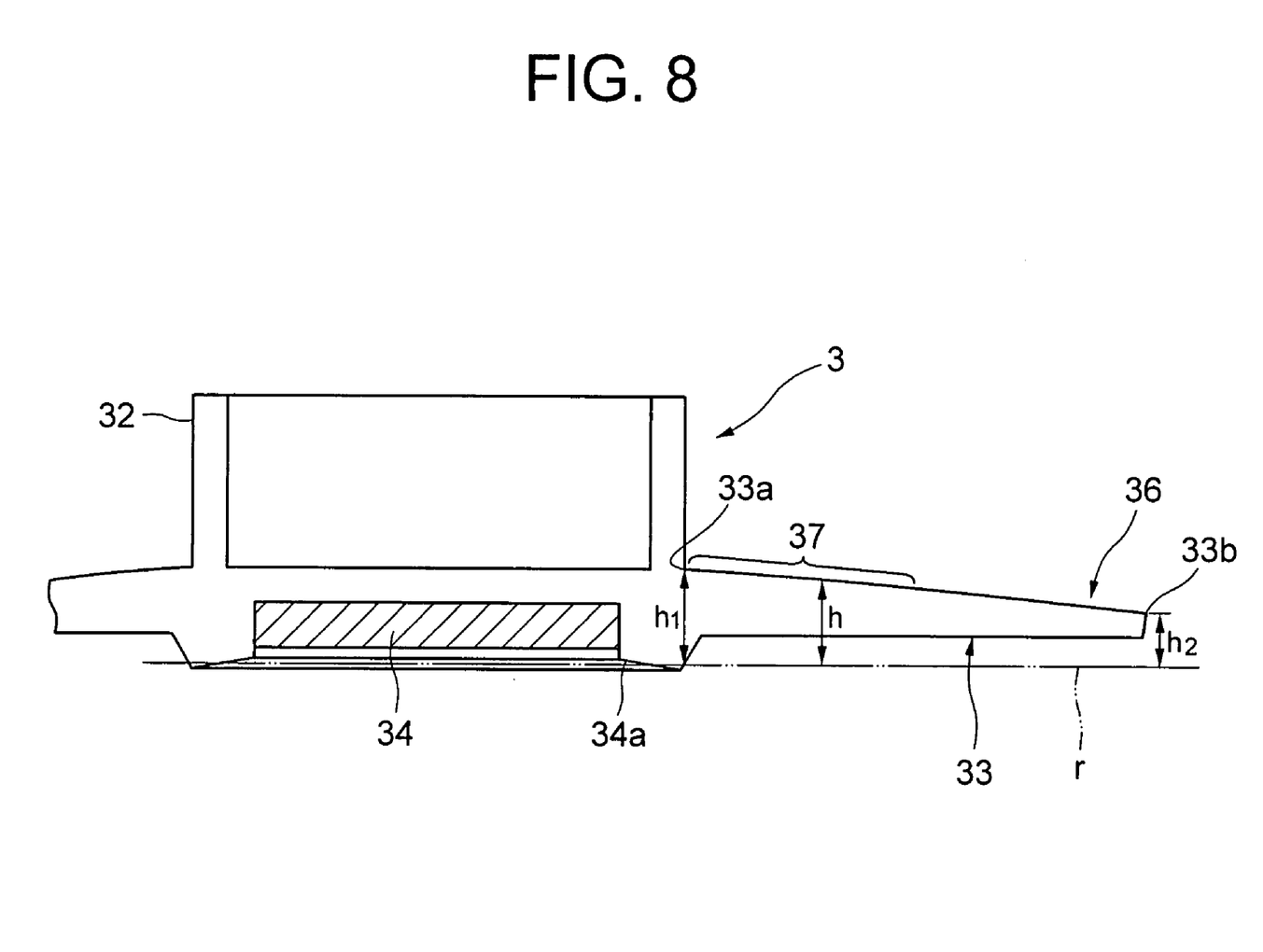
FIG. 8 is a side view of the main portion, which shows a reel hub portion molded by the molding mold shown in FIG. 5 to FIG. 7.

FIG. 8 is a side view of the main portion, which shows the reel hub portion after the molding shown in FIG. 1 (a part of FIG. 8 is shown by its section). In FIG. 8, a configuration of the inner side surface 36 of the lower flange 33 is exaggerated for convenience for its explanation.

As shown in FIG. 8, the upper flange 33 of the reel hub portion 3 molded as above-mentioned comprises the circular inner surface 36 extended from the root end 33a of the hub 32 to the circumferential end 33b. The inner surface 36 is formed by the flat area 106 of the molding mold 110 in FIG. 7 so that height h from a reference line r (which is corresponded to the reference line R in FIG. 7) passing through the substantially intermediate portion in a height direction of the engaging teeth 34a shown in the alternate long and two short dashes line in FIG. 8 is substantially linearly reduced from the root end 33a to the circumferential end 33b.

A circular area 107 in which height H from the reference line R in the flat area 106 of the molding mold 110 in FIG. 7 has become further higher corresponds to the circular surface 37 of an area over from the root end 33a at the inner surface 36 of the upper flange 33 in FIG. 8 to the substantially intermediate portion. Likewise, the height H is corrected as shown in FIG. 7 especially in the circular area 107 of the molding mold 110, resulting in that in the inner surface 36 at the side of the molding product in FIG. 8, a substantially linear gradient can be formed from the root end 33a to the circumferential end 33b.

When the metal plate 34 is molded integrally with the reel hub portion 3 by the insert molding, at a shrinkage process by cooling and hardening of resin, shrinkage is prevented by the insert-molded metal plate 34, resulting in that deformation will occur upon the molding because especially in the inner surface 36 of the lower flange 33 and in the circular surface 37 near the metal plate 34, the shrinkage is generated upon molding so that height from the reference line r is reduced in comparison with a case without insert-molding. In the present embodiment, as above-mentioned, the circular area 107 of the molding mold 110 in FIG. 7 corresponding to the circular surface 37 is corrected so as to be somewhat higher than the height from the reference line R in advance, resulting in that the inner surface 36 of the molded lower flange 33 is formed as a configuration of object such that the gradient becomes substantially linear from the root end 33a to the circumferential end 33b and that the inner surface 36 can be maintained in a predetermined configuration even if the metal plate 34 is insert-molded thereinto.

As above-mentioned, the inner surface 36 of the lower flange 33 of the reel hub portion 3 can be maintained in a predetermined configuration. Thus, by providing the reel hub portion 3 in the tape cartridge 100 in FIG. 1 to FIG. 3, it can securely be prevented that the tape-shaped recording medium T touches at the inner surface 36 of the flange 33 while the recording medium T is running in the recording and reproducing apparatus 200 in FIG. 4, resulting in that a stable and secure recording and reproducing becomes possible.

EXAMPLE

Next, description will be explained about an example the present invention in more detail. In FIG. 8, as an example, specified dimensions are defined. According to a standard as to a one-reel type tape cartridge for a computer, the height h1 of the root end 33a of the hub 32 in the lower flange 33 from the reference line r is within a range of 1.82 to 2.02 mm while the height h2 of the circumferential end 33b from the reference line r is within a range of 1.66 to 1.90 mm.

In the present example, a molding mold 110 as shown in FIG. 5 to FIG. 7 was produced, and a reel hub portion 3 in FIG. 1 (except for the upper flange 31) was molded.

Figure 9:
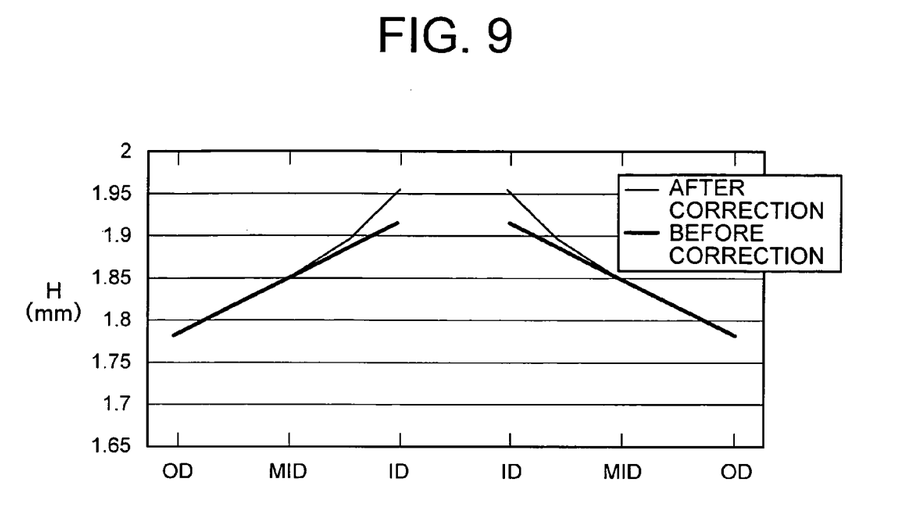
FIG. 9 is a graph showing a height H from a reference line R in a plane area of the molding mold corresponding to FIG. 5 to FIG. 7 in the present embodiment, which illustrates changing between height H before correction and height H after correction.

FIG. 9 is a graph showing the height H of the flat area 106 of the molding mold 110 from the base line R in the present example, in which changing states between the height H before correction and the height H after correction are shown. X-axis of FIG. 9 shows a position in a diameter-direction at the flat area 106, in which ID corresponds to the root end 103a in FIG. 7, OD corresponds to the circumferential end 103b therein, and an area between ID and MID corresponds to the circular area 107.

Figure 10:
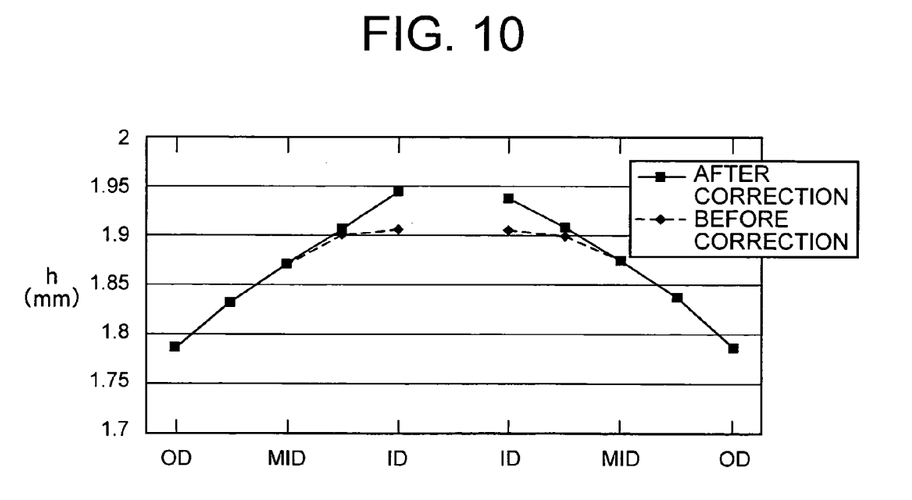
FIG. 10 is a graph showing a result of measurement of height h from the reference line r in FIG. 8 in an inner surface of a reel hub portion molded by the corrected molding mold as shown in FIG. 9, which also shows a result of measurement regarding the molded inner surface molded by a molding mold before correction.

FIG. 10 a graph showing a result of measurement of the height h of the inner surface 36 of the reel hub portion 3 molded by the corrected molding mold as shown in FIG. 9 from the reference line r in FIG. 8 and also a result of measurement of the inner surface molded by the molding mold before the correction. X-axis of FIG. 10 shows a position in a diameter-direction at the inner surface 36, ID corresponds to the root end 33a in FIG. 8, OD corresponds to the circumferential end 33b, and an area between ID and MID corresponds to the circular surface 37.

In the present example, as shown in FIG. 9, in the flat area 106 of the molding mold 110 in FIG. 7, the height H of the circular area 107 from ID to MID is corrected by performing correction largely in the side of ID, and thereafter by performing further correction therefor, the area 107 in the side of MID was gradually shaped into the configuration before correction. As a result, as shown in FIG. 10, in the inner surface 36 of the lower flange 33, a gradient could be obtained such that the height h from the reference line r was substantially linearly reduced from ID to OD. On the contrary thereto, in the molding mold before correction, as shown in FIG. 10, the gradient between ID and MID was deviated from a linear gradient as drawing near ID (the root end 33a).

As above-mentioned, the present invention has been explained by the embodiment and the example. However, the present invention is not limited to them. Various modifications are possible within a scope of a technical idea of the present invention. For example, the molding mold of the present invention is not limited to a molding mold for molding a reel hub portion being accommodated in a tape cartridge, which has a metal plate in an engaging surface in which the tape cartridge and a driving member at the side of a recording and reproducing apparatus are engaged. Also the molding mold can be applied to a molding mold for a molded product having any other flange configuration having an insert element.

According to the present embodiment, a molding mold and a molding method can be provided for molding a flange configuration in which the flange of a reel hub portion can be maintained in a predetermined configuration. Also, according thereto, a tape cartridge can be provided, which has a reel hub portion in which it can securely be prevented that a tape-shaped recording medium wound around a hub of a reel hub portion touches at the flange while the tape cartridge is being used.

What is claimed is:

1. A molding mold for molding a flange configuration provided with a reel hub portion having a flange and a hub arranged at a substantial center of said flange, and an insert portion disposed at a substantial center of said reel hub portion at an opposite side of said hub, comprising:
   a stationary side mold;
   a movable side mold; and
   a cavity formed between said stationary side mold and said movable side mold;
   said cavity, including:
   an insert attaching portion for attaching said insert portion by an insert molding;
   a flange forming portion for forming said flange; and
   a hub forming portion for forming said hub;
   wherein in a molding surface at a side of said hub forming portion of said flange forming portion, a dimension of a circular area over from a root end of said hub forming portion to a substantially intermediate portion between said root end and a circumferential end of said flange forming portion, is corrected in view of deformation upon molding.

2. A molding mold for molding a flange configuration provided with a reel hub portion having a flange and a hub arranged at a substantial center of said flange, and an insert portion disposed at a substantial center of said reel hub portion at an opposite side of said hub, comprising:
   a stationary side mold;
   a movable side mold; and
   a cavity formed between said stationary side mold and said movable side mold;
   said cavity, including:
   an insert attaching portion for attaching said insert portion by an insert molding;
   a flange forming portion for forming said flange; and
   a hub forming portion for forming said hub;
   wherein in a molding surface at a side of said hub forming portion of said flange forming portion, a dimension of a circular area over from a root end of said hub forming portion to a substantially intermediate portion between said root end and a circumferential end of said flange forming portion, is corrected, so that height from a reference position at a side of said insert portion is set to be larger than the dimension before correction of said dimension.

3. The molding mold according to claim 1, wherein an amount of correction of the dimension in said circular area is changed so that the amount in said root end is larger whereas the amount in said substantially intermediate portion is smaller.

4. The molding mold according to claim 2, wherein said height in said substantially intermediate portion is substantially as same as the height before correction of said dimension of said circular area.

5. A molding mold for molding a flange configuration provided with a reel hub portion having a flange and a hub arranged at a substantial center of said flange, and an insert portion disposed at a substantial center of said reel hub portion at an opposite side of said hub, comprising:
   a stationary side mold;
   a movable side mold; and
   a cavity formed between said stationary side mold and said movable side mold;
   said cavity, including:
   an insert attaching portion for attaching said insert portion by an insert molding;
   a flange forming portion for forming said flange; and
   a hub forming portion for forming said hub;
   wherein in a molding surface at a side of said hub forming portion of said flange forming portion, in a circular area over from a root end of said hub forming portion to a substantially intermediate portion between said root end and a circumferential end of said flange forming portion, height from a reference position at a side of said insert portion is gradually reduced from the root end to the circumferential end so that a degree of its reduction is large as compared with that of reduction from said substantially intermediate portion to said circumferential end.

6. The molding mold according to claim 5, wherein said height in said circular area is substantially linearly reduced at a first gradient, and said height from said substantially intermediate portion to said circumferential end is substantially linearly reduced at a second gradient being more gentle than said first gradient.

7. The molding mold according to claim 6, wherein a difference between height at said root end and height when extended to said base portion at said second gradient is within a range of 10 to 100 μm.

8. The molding mold according to claim 6, wherein a difference between height at said root end and height when extended to said base portion at said second gradient is within a range of 30 to 60 μm.

9. A molding method of molding a flange configuration using the molding mold according to claim 1.

10. The molding mold according to claim 2, wherein an amount of correction of the dimension in said circular area is changed so that the amount in said root end is larger whereas the amount in said substantially intermediate portion is smalter.

11. A molding method of molding a flange configuration using the molding mold according to claim 2.

12. A molding method of molding a flange configuration using the molding mold according to claim 5.

* * * * *